US010735924B2

(12) United States Patent
Thubert et al.

(10) Patent No.: US 10,735,924 B2
(45) Date of Patent: Aug. 4, 2020

(54) RE-BROADCASTING A MESSAGE BY A ROAD SIDE UNIT

(71) Applicant: Cisco Technology, Inc., San Jose, CA (US)

(72) Inventors: Pascal Thubert, La Colle sur Loup (FR); Srinath Gundavelli, San Jose, CA (US); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 16/149,237

(22) Filed: Oct. 2, 2018

(65) Prior Publication Data

US 2020/0107168 A1 Apr. 2, 2020

(51) Int. Cl.
*H04W 4/40* (2018.01)
*H04W 40/22* (2009.01)
(Continued)

(52) U.S. Cl.
CPC ............... *H04W 4/40* (2018.02); *H04W 4/06* (2013.01); *H04W 8/005* (2013.01); *H04W 12/10* (2013.01);
(Continued)

(58) Field of Classification Search
CPC ....... H04W 4/40; H04W 40/22; H04W 12/10; H04W 8/005; H04W 4/06; H04W 80/02; H04W 88/182
See application file for complete search history.

(56) References Cited

U.S. PATENT DOCUMENTS 8,560,609 B2 10/2013 Nathanson
8,954,205 B2 2/2015 Sagar et al.
(Continued)

FOREIGN PATENT DOCUMENTS

CN 1291360 C 12/2006
CN 101800988 B 8/2012
(Continued)

OTHER PUBLICATIONS

Salem et al. The Case for Dynamic Key Distribution for PKI-Based Vanets, Jan. 2014 [retrieved on Mar. 16, 2020], International Journal of Computer Networks & Communications (IJCNC) vol. 6, No. 1, Retrieved from Internet:<URL: https://arxiv.org/ftp/arxiv/papers/1605/1605.04696.pdf> <DOI : 10.5121/ijcnc.2014.6105>.*
(Continued)

*Primary Examiner* — Omar J Ghowrwal
(74) *Attorney, Agent, or Firm* — Behmke Innovation Group LLC; Kenneth J. Heywood; James J. Wong

(57) ABSTRACT

In one embodiment, a supervisory service receives a registration message broadcast by a first vehicle and captured by a RSU in the network of RSUs. The supervisory service registers the first vehicle by validating a signature of the registration message without registering a media access control (MAC) address of the first vehicle and without causing to send a registration response to the first vehicle. The supervisory service receives a message broadcast by a second vehicle addressed to the first vehicle and captured by at least one RSU in the network of RSUs. The supervisory service selects one or more RSUs in the network of RSUs to re-broadcast the message. The supervisory service controls the one or more RSUs to re-broadcast the message.

20 Claims, 8 Drawing Sheets

(51) Int. Cl.
*H04W 12/10* (2009.01)
*H04W 8/00* (2009.01)
*H04W 4/06* (2009.01)
*H04W 80/02* (2009.01)
*H04W 88/18* (2009.01)

(52) U.S. Cl.
CPC ............ *H04W 40/22* (2013.01); *H04W 80/02* (2013.01); *H04W 88/182* (2013.01)

(56) References Cited

U.S. PATENT DOCUMENTS

| | | | |
|---|---|---|---|
| 10,089,869 B1* | 10/2018 | Makled | G08G 1/205 |
| 2009/0161644 A1* | 6/2009 | Suzuki | H04W 72/10 |
| | | | 370/341 |
| 2009/0277998 A1* | 11/2009 | Kiss | B61L 1/162 |
| | | | 246/122 R |
| 2018/0262887 A1* | 9/2018 | Futaki | H04W 36/38 |
| 2019/0141568 A1* | 5/2019 | Balakrishnan | G06F 16/00 |
| 2019/0253852 A1* | 8/2019 | Bostrom | H04L 67/12 |
| 2019/0274107 A1* | 9/2019 | Park | H04W 56/0015 |

FOREIGN PATENT DOCUMENTS

| | | |
|---|---|---|
| CN | 104270461 B | 5/2017 |
| WO | WO-2017180999 A2 | 10/2017 |

OTHER PUBLICATIONS

Cansever, et al., "Integration of 6LoWPAN into IP networks", <draft-cansever-6lowpan-integration-00.txt>, 6lowpan—Internet-Draft, Nov. 11, 2007, 9 pages, IETF Trust.

Fotouhi, et al., "mRPL+: A mobility management framework in RPL/6LoWPAN", Computer Communications, vol. 104, May 15, 2017, pp. 34-54, Elsevier B.V.

Khan, Muhammad Shoaib., "6 LoWPAN: Efficient Routing Discovery Process for Wireless Sensor Networks (WSNs)", International Journal of Innovative Research in Advanced Engineering (IJIRAE), vol. 1 Issue 8, Sep. 2014, pp. 99-105, IJIRAE.

Kim, et al., "Design and Application Spaces for IPv6 over Low-Power Wireless Personal Area Networks (6LoWPANs)", Internet Engineering Task Force (IETF)—Request for Comments: 6568, Apr. 2012, 28 pages, IETF Trust.

Kumar et al., "Study Paper on IPv6 for Adhoc Networks [Sensor N/w & RFID]", http://tec.gov.in/pdf/Studypaper/Study%20paper%20IPv6_Adhoc_Networks.pdf, 18 pages, Accessed on Dec. 26, 2017, Department of Telecommunications—Telecom Engineering Center, New Delhi.

Sarikaya, et al., "Address Protected Neighbor Discovery for Low-power and Lossy Networks", <draft-ietf-6lo-ap-nd-04>, 6lo-Internet-Draft, Nov. 14, 2017, 17 pages, IETF Trust.

Thubert, et al., "An Update to 6LoWPAN ND", <draft-ietf-6lo-rfc6775-update-10>, 6lo-Internet-Draft, Oct. 13, 2017, 35 pages, IETF Trust.

Thubert, P., "IPv6 Backbone Router", <draft-ietf-6lo-backbone-router-04>,6lo-Internet-Draft, Jul. 17, 2017, 29 pages, IETF Trust.

"Network Security Analytics", https://www.extrahop.com/solutions/initiative/security/, 6 pages, Accessed on Dec. 26, 2017, ExtraHop Networks.

* cited by examiner

RE-BROADCASTING A MESSAGE BY A ROAD SIDE UNIT

TECHNICAL FIELD

The present disclosure relates generally to computer networks, and, more particularly, to neighbor discovery (ND) proxy operations for road side communication.

BACKGROUND

Many vehicles, such as automobiles, are becoming increasingly sophisticated in terms of on-board sensors, sensor data processing, and overall vehicle capabilities. For example, autonomous vehicles, also sometimes referred to as self-driving cars, may leverage complex sensors and data processing techniques, to route the vehicles to their destinations and avoid roadway hazards. Trials of autonomous vehicles are now being conducted in many cities.

With the increasing computerization of vehicles also comes an increasing push to connect vehicles to other systems (V2X). For example, vehicle to vehicle (V2V) communications allows nearby vehicles to share data between one another, such as detected hazards, coordinating platoons of autonomous vehicles that travel together in unison, and the like. Similarly, vehicle to infrastructure (V2I) communications allow vehicles to communicate with existing computer networks, such as the Internet. By connecting vehicles to the existing infrastructure, it becomes possible to manage and monitor large numbers of vehicles at once. For example, a central traffic service could potentially route vehicles in a city, so as to minimize traffic in the city (e.g., by load balancing the vehicle traffic along the different roads).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
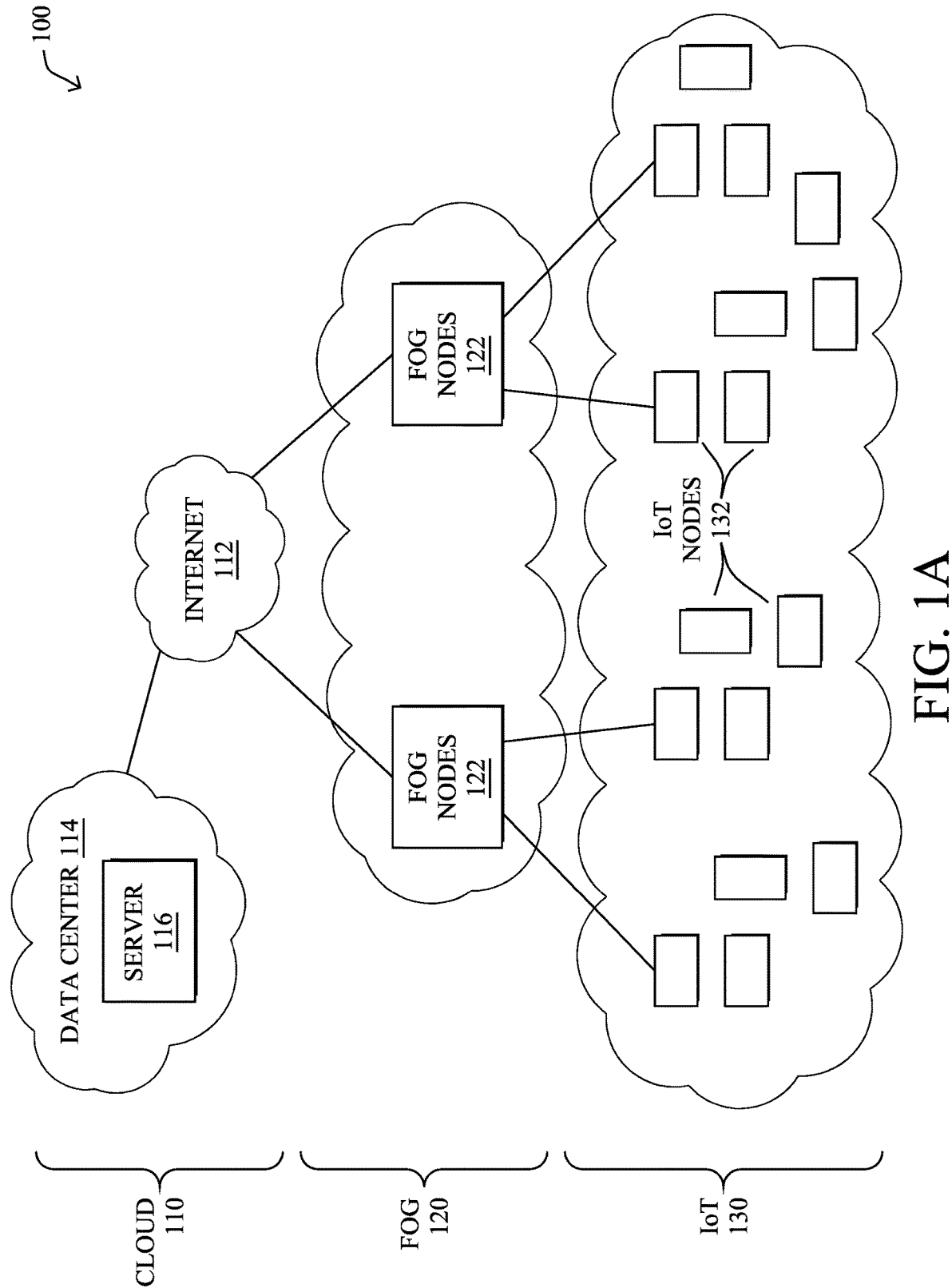
FIGS. 1A-1B illustrate an example communication network.

According to one or more embodiments of the disclosure, a supervisory service receives a registration message broadcast by a first vehicle and captured by a RSU in the network of RSUs. The supervisory service registers the first vehicle by validating a signature of the registration message without registering a media access control (MAC) address of the first vehicle and without causing to send a registration response to the first vehicle. The services receives a message broadcast by a second vehicle addressed to the first vehicle and captured by at least one RSU in the network of RSUs. The supervisory service selects one or more RSUs in the network of RSUs to re-broadcast the message. The supervisory service controls the one or more RSUs to re-broadcast the message.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to IoT endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, Power Line Communications (PLC) protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
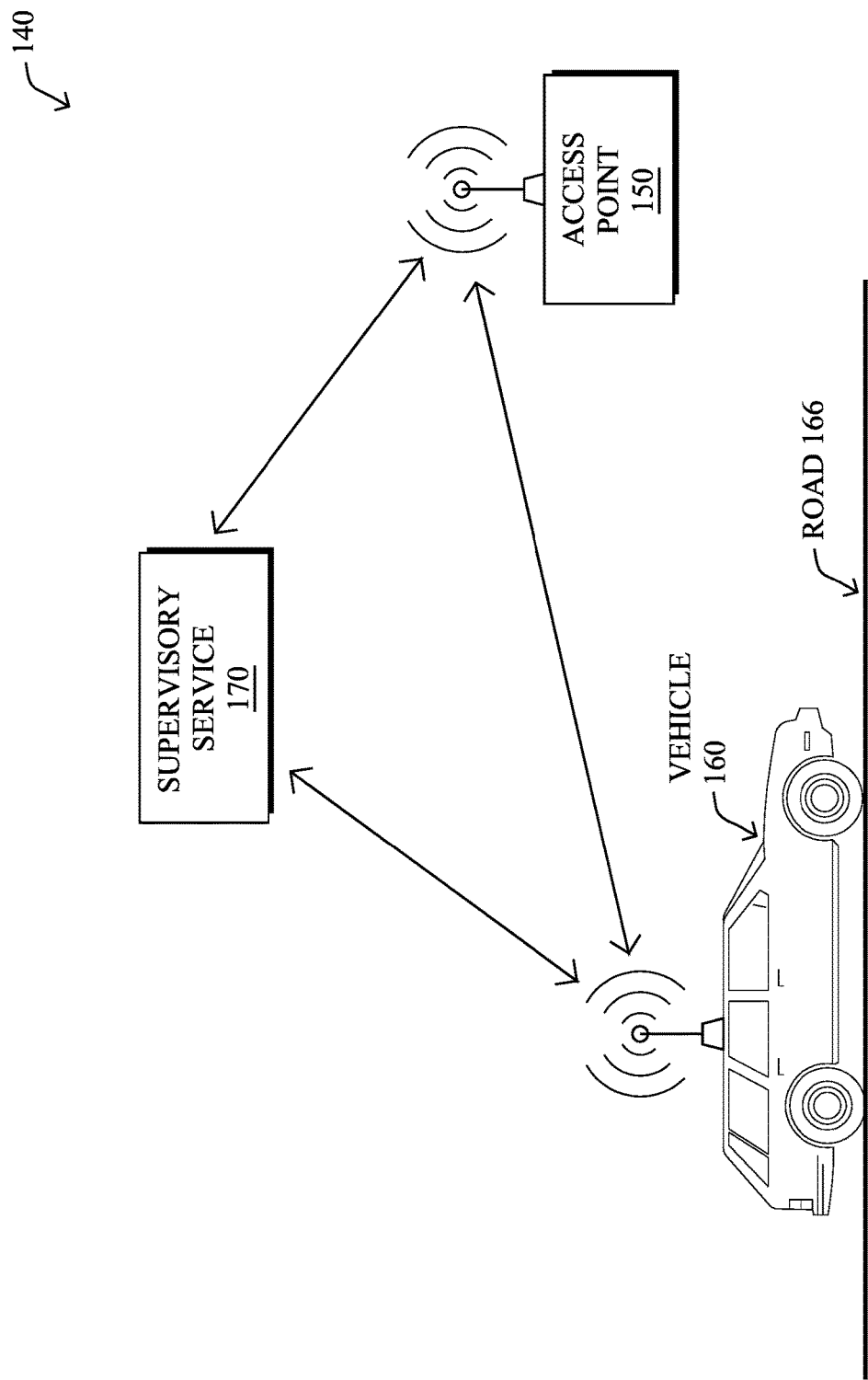

FIG. 1B illustrates an example connected vehicle system 140, according to various embodiments. In particular, connected vehicle system 140 may include any or all of the following components: a vehicle 160 on a road 166, an access point 150, and/or a remote supervisory service 170. During operation, connected vehicle system 140 may be operable to interface vehicle 160 with a backend computer network, such as the Internet, to which supervisory service 170 belongs.

In some embodiments, connected vehicle system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, access point 150 may be a fog node 122 at fog computing layer 120, while vehicle 160 may be viewed as an IoT node 132 at IoT layer 130. Thus, vehicle 160 may communicate directly with access point 150, and/or via other IoT nodes 132 (e.g., other vehicles, roadside sensors, etc.), and access point 150 may provide some degree of processing or storage over the communicated data.

Generally, as shown, vehicle 160 may be an automobile, motorcycle, truck, aircraft, autonomous drone, or any other type of vehicle configured to communicate via connected vehicle system 140. In some embodiments, vehicle 160 may be a fully autonomous vehicle or a semi-autonomous vehicle that allows a driver to exert control over vehicle 160, as desired.

Access point 150 may communicate with supervisory service 170 via a WAN, such as the Internet 112 or another WAN. For example, access point 150 may communicate with supervisory service 170 by leveraging a hardwired network connection, cellular or other wireless connection, satellite connection, or the like. Communications between vehicle 160 and access point 150 may generally be wireless and use any form of known wireless communication (e.g., Wi-Fi™, cellular, light-based, etc.). More specifically, access point 150 may be part of a radio access network that provides wireless connectivity between a backbone network and vehicle 160.

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, if vehicle 160 is an electric vehicle, processors controlling vehicle body functions, and the like. A local gateway of vehicle 160 may provide communicative connectivity between the local network of vehicle 160 and other devices.

Figure 2:
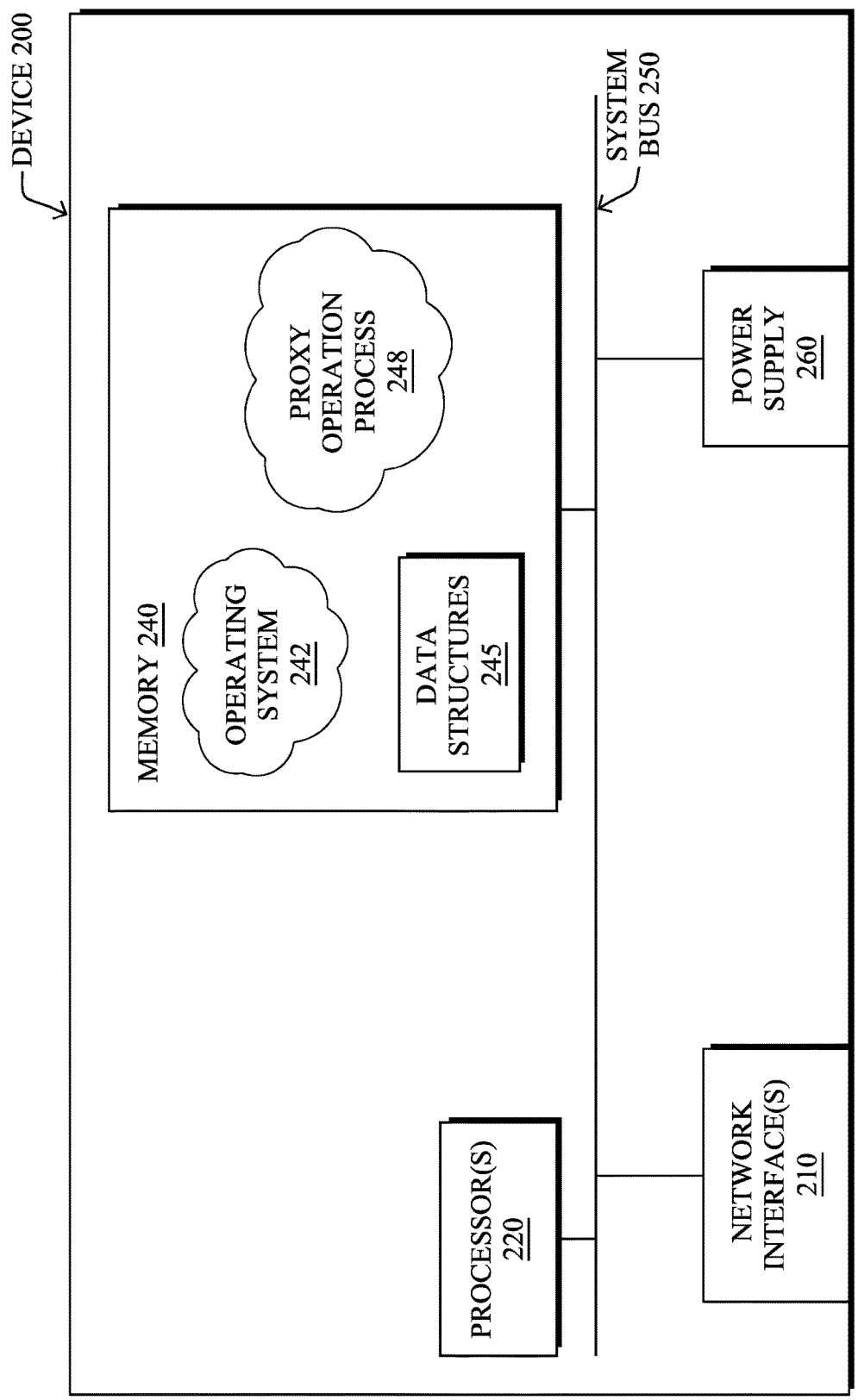
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative proxy operations process 248, as described herein.

In general, proxy operations process 248 may be configured to select one or more RSUs to re-broadcast a message sent by a vehicle. In some embodiments, proxy operations process 248 may do so by leveraging machine learning, to select the one or more RSUs. In general, machine learning is concerned with the design and the development of techniques that take as input empirical data and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, proxy operations process 248 may employ one or more supervised, unsupervised, or semi-supervised machine learning models. Generally, supervised learning entails the use of a training set of data, as noted above, that is used to train the model to apply labels to the input data. For example, the training data may include data indicative of the connectivity of the various vehicles. On the other end of the spectrum are unsupervised techniques that do not require a training set of labels. Notably, while a supervised learning model may look for previously seen patterns that have been labeled, as such, an unsupervised model may instead look to whether there are sudden changes in the behavior. Semi-supervised learning models take a middle ground approach that uses a greatly reduced set of labeled training data.

Example machine learning techniques that proxy operations process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes, or operate concurrently.

As noted above, vehicles are becoming increasingly sophisticated and many vehicles today are connected vehicles capable of communicating wirelessly via the Internet. In vehicle to vehicle (V2V) communications, a source vehicle of a communication (e.g., a message) is unable to determine whether a destination vehicle for the communication has received the communication either over direct line of sight or indirectly. Furthermore, in vehicle to infrastructure communications (V2I), a road side unit (RSU) the acts as an intermediary that can re-transmit the communication between the source vehicle and the destination vehicle. Because the destination vehicle may be moving at a fast speed, the statistical chance that the destination vehicle receives the re-transmitted communication is very slight. Additionally, the RSU, like the source vehicle, is unable to determine whether the destination vehicle has received the message. In order to improve communications for fast moving objects (e.g., the source vehicle or the destination vehicle), RSU(s) can be configured to relay messages over an infrastructure backbone in situations where line of sight communication fails (from an RSU to a destination vehicle). Because of the relayed messages, multiple copies of a message may be generated and sent to multiple RSUs that are close to the destination vehicle. Conventional wireless communication standards (e.g., Internet Protocol version 6 (IPv6) Neighbor Discovery (ND)), however, are not currently capable of relaying messages in such a manner.

Neighbor Discovery (ND) Proxy Operations for Road Side Communication

The techniques herein allow for ND proxy operations for road side communication in a way that adapts IPv6 over Low-Power Wireless Personal Area Networks (6LoWPAN) ND for fast moving objects, particularly vehicles. In some aspects, 6LoWPAN ND registration can be modified such that a ND proxy (e.g., a backbone router) can be configured to re-broadcast messages sent by a source vehicle to a destination vehicle. Specifically, 6LowPAN ND registration be can adapted for fast moving objects (e.g., vehicles), by having a supervisory service (e.g., executed in a network backbone of RSUs) validate a signature of a registration message of a source vehicle without registering a MAC address and without causing to send a registration response to the source vehicle.

Specifically, according to one or more embodiments of the disclosure as described in detail below, a supervisory service receives a registration message broadcast by a first vehicle and captured by a RSU in a network of RSUs. The supervisory service registers the first vehicle by validating a signature of the registration message without registering a MAC address of the first vehicle and without causing to send a registration response to the first vehicle. The supervisory service receives a message broadcast by a second vehicle addressed to the first vehicle and captured by at least one RSU in the network of RSUs. The supervisory service selects one or more RSUs in the network of RSUs to re-broadcast the message. The supervisory service controls the one or more RSUs to re-broadcast the message.

Illustratively, the techniques described herein may be performed by hardware, software, and/or firmware, such as in accordance with the proxy operations process 248, which may include computer executable instructions executed by the processor 220 (or independent processor of interfaces 210) to perform functions relating to the techniques described herein, e.g., in conjunction with routing process 244.

Figure 3A:
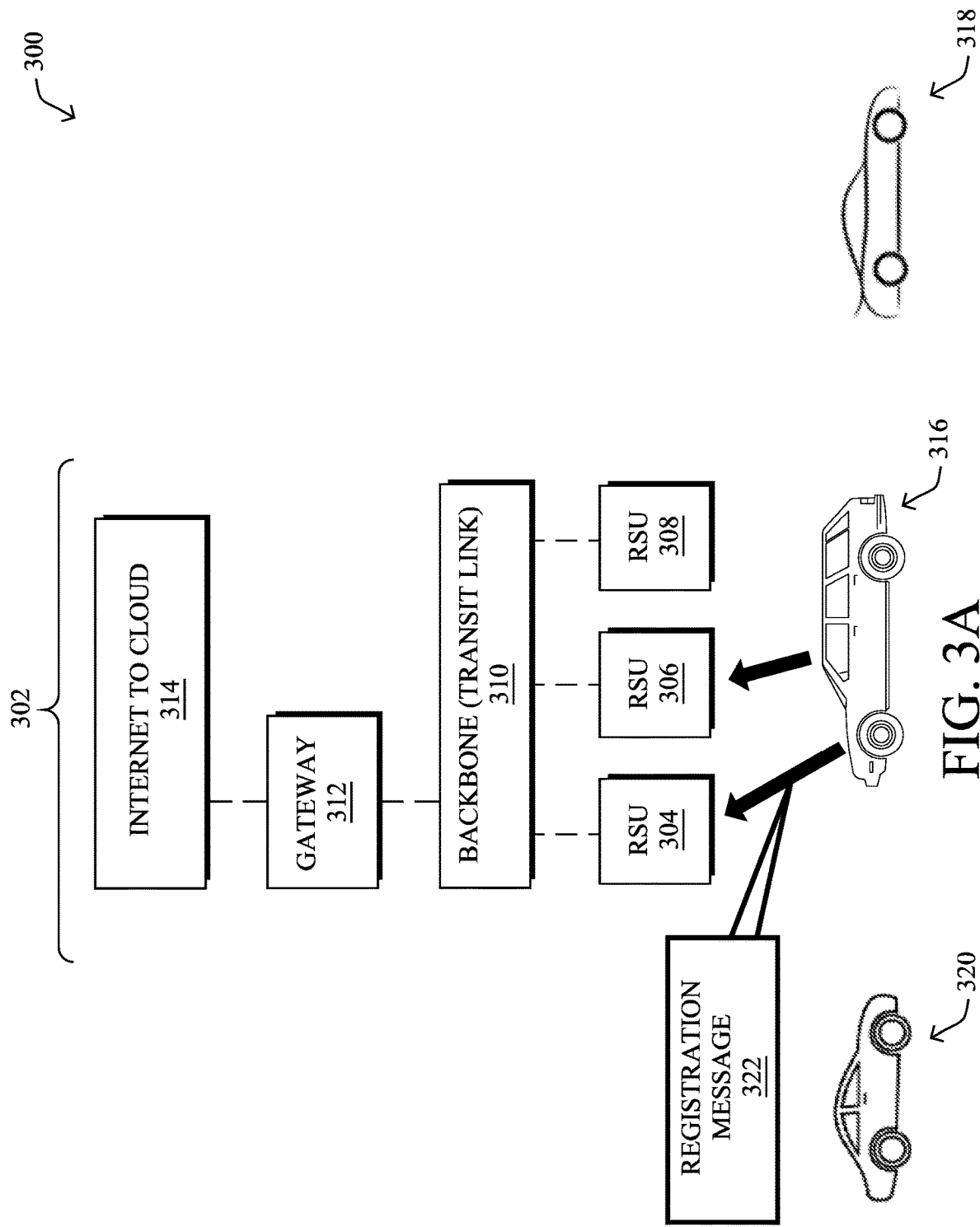
FIGS. 3A-3D illustrate an example architecture for neighbor discovery (ND) proxy operations for road side communication.

Operationally, FIGS. 3A-3D illustrate an example architecture for ND proxy operations for road side communication. With reference to FIG. 3A, a system 300 for communication among vehicles is illustrated. In particular, the system 300 comprises a network infrastructure 302 that includes a plurality of RSUs 304-308. A backbone 310 (e.g., transit link) enables communication among the plurality of RSUs 304-308, and a gateway 312, in communication with the backbone 310, enables communication with the Internet (or a cloud network) 314. Further, the system 300 includes a first vehicle 316, a second vehicle 318, and a third vehicle 320.

In general, onboard units (OBUs) of the vehicles 316-320 are configured to receive broadcast messages (e.g., packets) from the plurality of RSUs 304-308 and filter the broadcast messages based on a destination IPv6 address in the broadcast messages. The plurality of RSUs 304-308 can be configured to execute a supervisory service in accordance with proxy operations process 248 such that, when the supervisory service receives a message that includes a destination IPv6 address that matches a registered vehicle (or OBU of the vehicle), it controls one or more RSUs to re-broadcast the message. Specifically, the supervisory service can be configured to select the one or more RSUs to re-broadcast the message based on an estimated location of a destination vehicle (e.g., determined by machine learning).

As shown in FIG. 3A, the first vehicle 316 broadcasts a registration message 322 (e.g., according to IPv6 ND). A first RSU 304 (and, optionally, additional RSUs) captures the registration message 322. The supervisory service registers the first vehicle 316 by validating a signature of the registration message 322 without registering a MAC address of the first vehicle and without causing to send a registration response to the first vehicle. In particular, the signature of the registration message 322 can include sequence counter and a nonce. The nonce is generated by an iterator and progresses with the sequence counter. Additionally, the first vehicle can broadcast the registration message 322 at an advertisement interval determined by a machine learning process or plain logic. The supervisory service can be configured to delete temporally old registrations (e.g., by polling registered vehicles to determine whether vehicles are still proximate to an RSU).

Figure 3B:
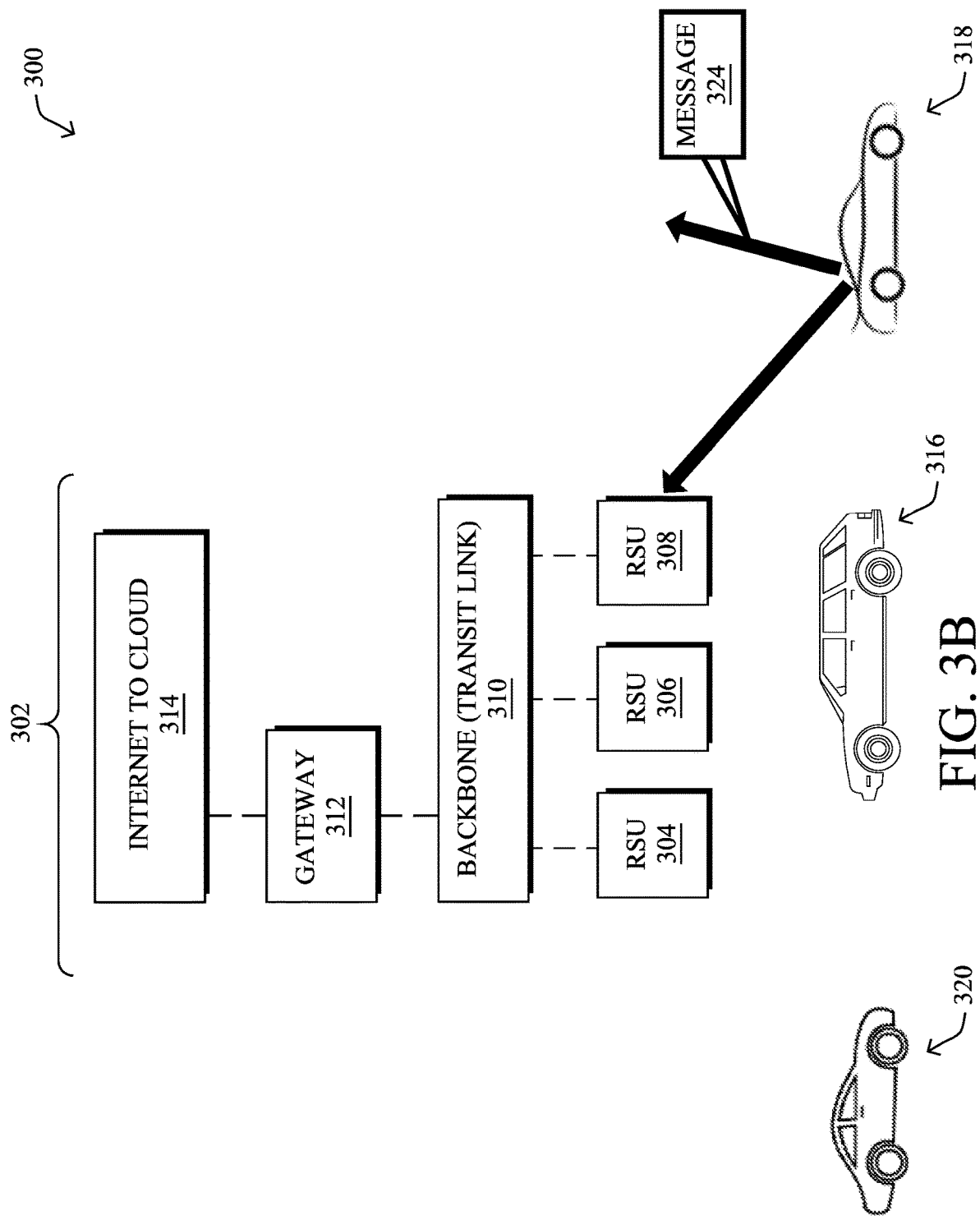

With reference to FIG. 3B, the second vehicle 318 then broadcasts a message 324 that is intended for the first vehicle 316. The message 324 can comprise a broadcast MAC of the plurality of RSUs 304-308 or of the supervisory service and a unicast IPv6 address is associated with the first vehicle 316. A second RSU 308 captures the message 324. In situations where the second vehicle 318 is within line of sight of the first vehicle 316 when the second vehicle 318 broadcasts the message 324, the first vehicle 316 may (in addition to or in lieu of the second RSU 308 capturing the message 324) receive the message 324 directly from the second vehicle 318 (based on the broadcast MAC). In one embodiment, an RSU that receives a packet to prefix that is not on the same road side may pass it to a gateway that optionally eliminates duplicates. Conversely, an RSU that receives a packet to prefix on the same road side may look up the RSUs that have a registration. In situations where the prefix is associated with the second RSU 308, the supervisory service, with reference to FIG. 3C, can be configured to select one or more RSUs in the plurality of RSUs 304-308 to re-broadcast the message 324.

Figure 3C:
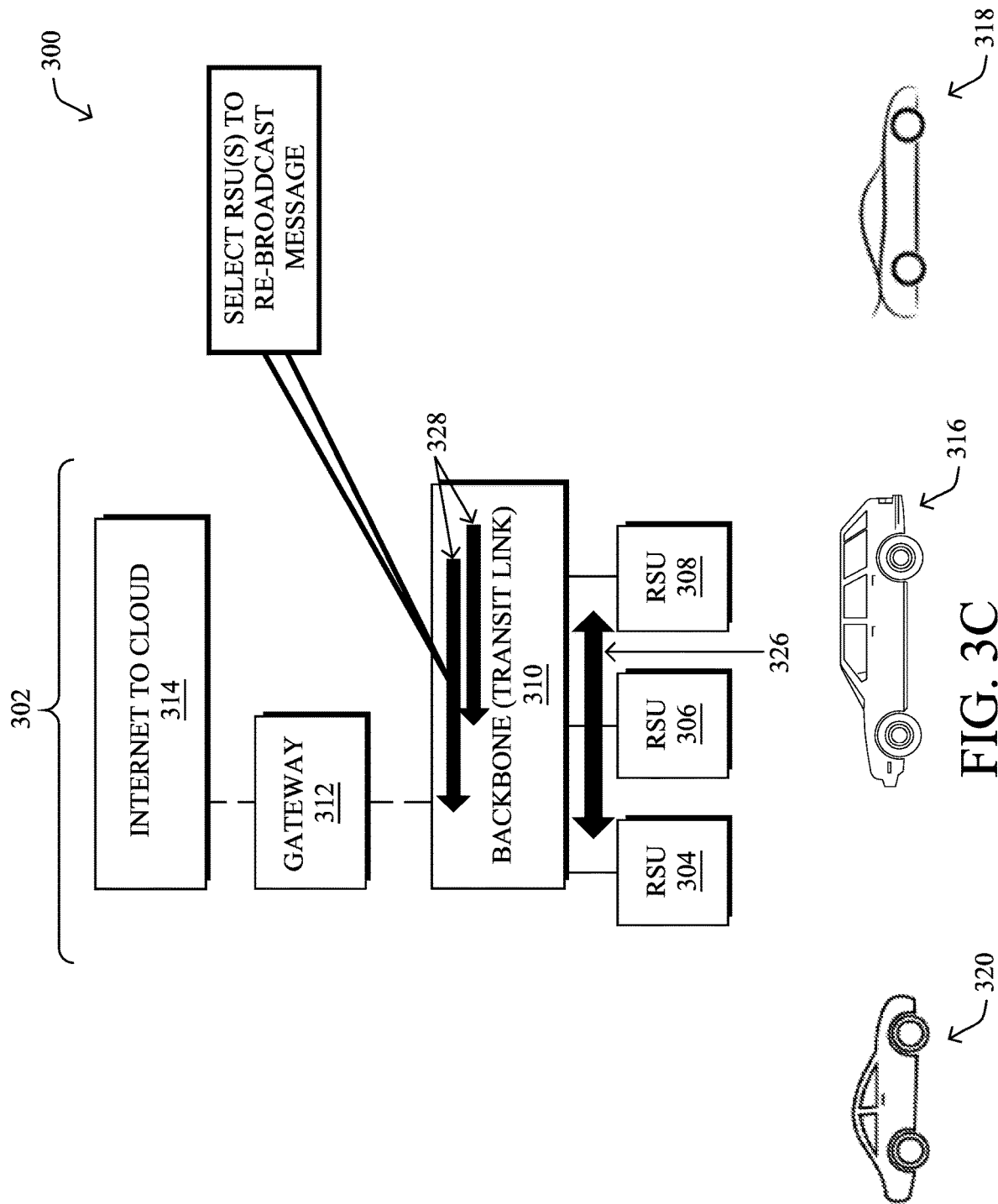

The supervisory service can select the one or more RSUs based on a fuzzy selection of a target RSU(s). In an example, subsequent to receiving the message 324, the second RSU 308 can be configured to a lookup query the first RSU 304 or a third RSU 306 to determine whether the first vehicle 316 has registered with either the first RSU 304 or the third RSU 306. Each of the first RSU 304 and the third RSU 306 may respond to the lookup query, confirming that the first vehicle 316 is registered. An exchange 326 of the lookup query and the response to the lookup query is shown in FIG. 3C. The supervisory service can select the one or more RSUs to re-broadcast the message 324 based on RSUs that have responded to lookup queries that indicated that a RSU has registered the first vehicle 316. The supervisory service can be further configured to select RSUs only if an RSU as a particular sequence count (e.g., associated with a more temporally recent registration of the first vehicle 316).

In addition or in the alternative, the supervisory service can select the one or more RSUs based on an estimated location of the first vehicle 316 that is determined by the supervisory service. In particular, the supervisory service can be configured to infer a movement and speed of the first vehicle 316 based on locations of RSUs that the first vehicle 316 has registered with, as described above. The supervisory service can implement a machine learning model to determine the estimated location of the first vehicle 316. The machine learning model can take into account vehicle speed, vehicle behavior, vehicle direction, or network topology (e.g., of the plurality of RSUs 304-308, the gateway 312, the backbone 310, and the Internet (or a cloud network) 314)).

In an example, supervised learning can be used with a highway maintenance truck that circulates a highway. The supervisory service can record a MAC address of an RSU that successfully transmits to the truck, and then the supervisory service can compare the successful transmission with logic that selected a number of RSUs. The supervisory service can learn from the successful selection of the RSU by the logic. The supervised learning model can use load of the highway, weather conditions surrounding the highway, time of day, speed, or location of the truck as inputs.

The supervisory service can, alternatively, implement plain logic to determine the estimated location. Based on the estimated location, the supervisory service can determine that the first vehicle 316 is moving away from certain RSUs. The supervisory service can, based on this determination, then not select the certain RSUs to re-broadcast the message 324. Additionally, the supervisory can determine that the first vehicle 316 is moving towards other RSUs, and then select the other RSUs to re-broadcast the message.

In an embodiment, after selecting the one or more RSUs to re-broadcast the message 324, the supervisory can control the second RSU 308 (that received the message 324) to unicast the message 324 to the selected one or more RSUs. As shown in FIG. 3C, the second RSU 308 sends a unicast message 328 to RSUs in the plurality of RSUs 304-308.

Figure 3D:
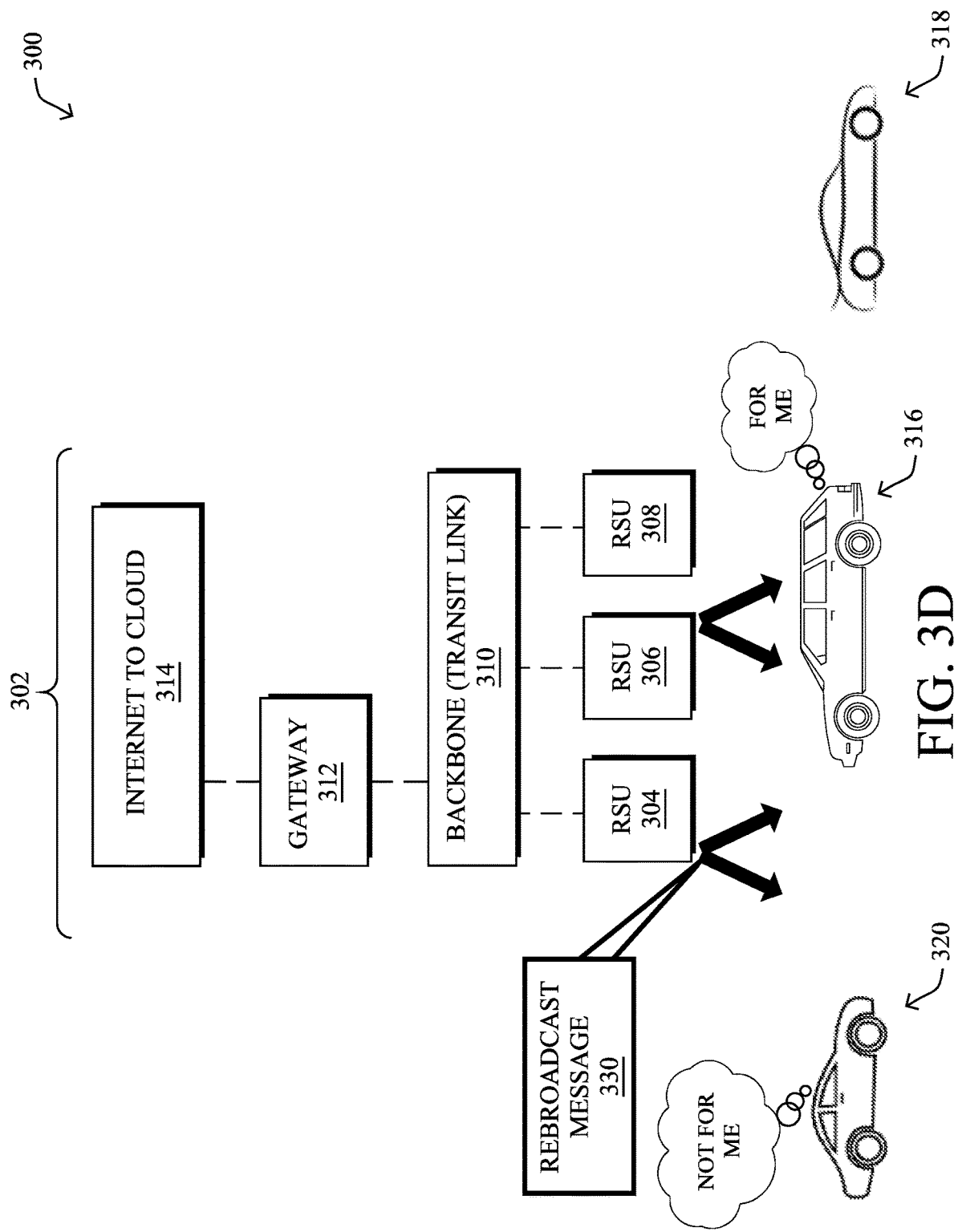

With reference to FIG. 3D, the supervisory service controls the first RSU 306 and a third RSU 304 to re-broadcast the message 324 in one or more re-broadcast messages 330. In particular, one or more re-broadcast messages 330 can include the broadcast MAC of the plurality of RSUs 304-

308 or of the supervisory service and the unicast IPv6 address is associated with the first vehicle 316. The first vehicle 316 captures the one or more re-broadcast messages 330.

Figure 4:
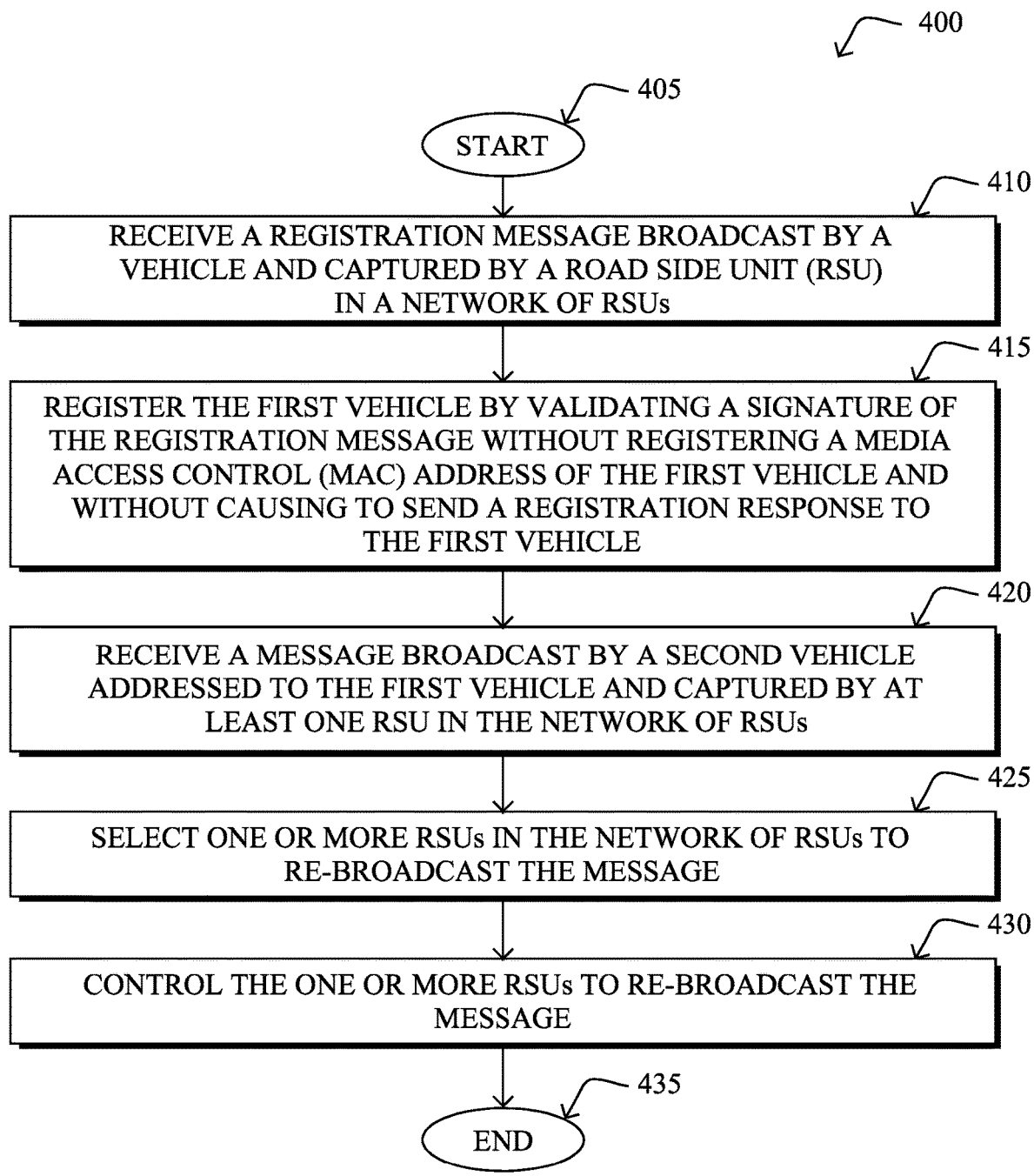
FIG. 4 illustrates an example simplified procedure for controlling messages broadcast by vehicles.

FIG. 4 illustrates an example simplified procedure for controlling messages broadcast by vehicles, in accordance with one or more embodiments described herein. For example, a non-generic, specifically configured device (e.g., device 200) may perform procedure 400 by executing stored instructions (e.g., process 248). The procedure 400 may start at step 405, and continues to step 410, where, as described in greater detail above, the device may receive a registration message broadcast by a first vehicle and captured by a RSU in a network of RSUs. In various embodiments, the first vehicle broadcasts the registration message at an advertisement interval determined by a machine learning process or plain logic, according to machine learning principles described above. Further, the signature of the registration message can comprise a sequence counter and a nonce, wherein the nonce is generated by an iterator and progresses with the sequence counter. Additionally, a plurality of RSUs in the network of RSUs can capture the registration message.

At step 415, as described in greater detail above, the device may register the first vehicle by validating a signature of the registration message without registering a MAC address of the first vehicle and without causing to send a registration response to the first vehicle. In various embodiments, the device can be configured to delete temporally old registrations (e.g., by polling registered vehicles to determine whether vehicles are still proximate to an RSU).

At step 420, the device may receive a message broadcast by a second vehicle addressed to the first vehicle and captured by at least one RSU in the network of RSUs. In some embodiments, the message comprises a broadcast MAC address addressed to the network of RSUs and a unicast IP address of the second vehicle.

At step 425, as detailed above, the device may select one or more RSUs in the network of RSUs to re-broadcast the message. In various embodiments, the device may select the one or more RSUs based on whether an RSU has registered the first vehicle. The device can determine whether the RSU has registered the first vehicle by an exchange of a lookup query and response. Further, the device can be configured to determine an estimated location of the first vehicle, where the selection of the one or more RSUs is based on the estimated location. The device can determine the estimated location, for example, based on a machine learning model. Input for the machine learning model can include: a speed of the first vehicle, a direction of the first vehicle, a behavior of the first vehicle, a network topology of the network of RSUs.

At step 430, as detailed above, the device may control the one or more RSUs to re-broadcast the message. In various embodiments, the device may control an RSU to unicast the message to another RSU, then control the another RSU to re-broadcast the message. Procedure 400 then ends at step 435.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for ND proxy operations for road side communication of connected vehicles, such as automobiles, trains, planes, boats, or the like, or even certain non-vehicle devices. In some aspects, the techniques herein leverage machine learning, to select one or more RSUs to re-broadcast a message broadcast by a first vehicle and addressed to a second vehicle. By leveraging the ND proxy operations, the techniques herein allow for communication between vehicles, even when they are not in the direct line of sight. Further the techniques herein enable the use of 6LoWPAN with fast moving vehicles by enabling vehicle registration without registering a MAC address of a first vehicle and without sending a registration response to the vehicle.

While there have been shown and described illustrative embodiments that provide for controlling messages broadcast by vehicles, it is to be understood that various other adaptations and modifications may be made within the spirit and scope of the embodiments herein. For example, while certain embodiments are described herein with respect to using certain models for purposes of selecting one or more RSUs to re-broadcast a message, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on is a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, by a supervisory service of a network of road side units (RSUs), a registration message broadcast by a first vehicle and captured by a RSU in the network of RSUs, the registration message comprising a signature that includes a sequence counter and a nonce;
registering, by the supervisory service, the first vehicle by validating the signature of the registration message without registering a media access control (MAC) address of the first vehicle and without causing to send a registration response to the first vehicle;
receiving, by the supervisory service, a message broadcast by a second vehicle addressed to the first vehicle and captured by at least one RSU in the network of RSUs;
selecting, by the supervisory service, one or more RSUs in the network of RSUs to re-broadcast the message; and
controlling, by the supervisory service, the one or more RSUs to re-broadcast the message.

2. The method of claim 1, wherein the first vehicle broadcasts the registration message at an advertisement interval determined by a machine learning process or plain logic.

3. The method of claim 1, wherein the nonce is generated by an iterator and progresses with the sequence counter.

4. The method of claim 1, wherein the registration message is captured by a plurality of RSUs in the network of RSUs.

5. The method of claim 1, wherein the message comprises a broadcast MAC address addressed to the network of RSUs and a unicast internet protocol (IP) address of the second vehicle.

6. The method of claim 1, further comprising:
determining, by the supervisory service, an estimated location of the first vehicle, wherein selecting, by the supervisory service, the one or more RSUs in the network of RSUs to re-broadcast the message is based on the estimated location of the first vehicle.

7. The method of claim 6, wherein determining, by the supervisory service, the estimated location of the first vehicle comprises using, by the supervisory service, a machine learning model to determine the estimated location of the first vehicle.

8. The method of claim 7, wherein input data for the machine learning model comprises at least one of: a speed of the first vehicle, a direction of the first vehicle, a behavior of the first vehicle, a network topology of the network of RSUs.

9. The method of claim 1, wherein controlling, by the supervisory service, the one or more RSUs to re-broadcast the message comprises, controlling, by the supervisory service, at least one RSU of the network of RSUs to unicast the message to another RSU of the network of RSUs.

10. The method of claim 1, wherein the first vehicle and the second vehicle comprise autonomous vehicles or semi-autonomous vehicles.

11. An apparatus, comprising:
one or more network interfaces to communicate with a network;
a processor coupled to the network interfaces and configured to execute one or more processes; and
a memory configured to store a process executable by the processor, the process when executed configured to:
receive a registration message broadcast by a first vehicle and captured by a road side unit (RSU) in a network of RSUs, the registration message comprising a signature that includes a sequence counter and a nonce;
register the first vehicle by validating the signature of the registration message without registering a media access control (MAC) address of the first vehicle and without causing to send a registration response to the first vehicle;
receive a message broadcast by a second vehicle addressed to the first vehicle and captured by at least one RSU in the network of RSUs;
select one or more RSUs in the network of RSUs to re-broadcast the message; and
control the one or more RSUs to re-broadcast the message.

12. The apparatus as in claim 11, wherein the first vehicle broadcasts the registration message at an advertisement interval determined by a machine learning process or plain logic.

13. The apparatus as in claim 11, wherein the nonce is generated by an iterator and progresses with the sequence counter.

14. The apparatus as in claim 11, wherein the registration message is captured by a plurality of RSUs in the network of RSUs.

15. The apparatus as in claim 11, wherein the message comprises a broadcast MAC address addressed to the network of RSUs and a unicast internet protocol (IP) address of the second vehicle.

16. The apparatus as in claim 11, wherein the process when executed is further configured to:
determine an estimated location of the first vehicle, wherein the selection of the one or more RSUs in the network of RSUs to re-broadcast the message is based on the estimated location of the first vehicle.

17. The apparatus as in claim 16, wherein the determination of the estimated location of the first vehicle comprises using a machine learning model to determine the estimated location of the first vehicle.

18. The apparatus as in claim 11, wherein to control of the one or more RSUs to re-broadcast the message comprises controlling at least one RSU of the network of RSUs to unicast the message to another RSU of the network of RSUs.

19. The apparatus as in claim 11, wherein the first vehicle and the second vehicle comprise autonomous vehicles or semi-autonomous vehicles.

20. A tangible, non-transitory, computer-readable medium storing program instructions that cause a device to execute a process comprising:
receiving, by the device, a registration message broadcast by a first vehicle and captured by a road side unit (RSU) in a network of RSUs, the registration message comprising a signature that includes a sequence counter and a nonce;
registering, by the device, the first vehicle by validating the signature of the registration message without registering a media access control (MAC) address of the first vehicle and without causing to send a registration response to the first vehicle;
receiving, by the device, a message broadcast by a second vehicle addressed to the first vehicle and captured by at least one RSU in the network of RSUs;
selecting, by the device, one or more RSUs in the network of RSUs to re-broadcast the message; and
controlling, by the device, the one or more RSUs to re-broadcast the message.

* * * * *

UNITED STATES PATENT AND TRADEMARK OFFICE
CERTIFICATE OF CORRECTION

PATENT NO. : 10,735,924 B2
APPLICATION NO. : 16/149237
DATED : August 4, 2020
INVENTOR(S) : Pascal Thubert et al.

Page 1 of 1

It is certified that error appears in the above-identified patent and that said Letters Patent is hereby corrected as shown below:

In the Specification

Column 10, Line 32, should read:
ing on a computer, hardware, firmware, or a combination Signed and Sealed this
First Day of December, 2020

Andrei Iancu
*Director of the United States Patent and Trademark Office*